United States Patent
Jeon

(10) Patent No.: US 7,713,170 B2
(45) Date of Patent: May 11, 2010

(54) SHIFT CONTROL METHOD OF AUTOMATIC TRANSMISSION

(75) Inventor: Byeong Wook Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 356 days.

(21) Appl. No.: 11/781,492

(22) Filed: Jul. 23, 2007

(65) Prior Publication Data

US 2008/0026906 A1    Jan. 31, 2008

(30) Foreign Application Priority Data

Jul. 31, 2006    (KR) .................. 10-2006-0072396

(51) Int. Cl.
*F16H 61/26* (2006.01)
(52) U.S. Cl. .................. 477/162; 477/159; 477/164
(58) Field of Classification Search ............ 477/156, 477/158–160, 162–164
See application file for complete search history.

(56) References Cited

U.S. PATENT DOCUMENTS 5,415,056 A * 5/1995 Tabata et al. ............. 74/335
5,505,673 A * 4/1996 Tsukamoto et al. ........ 477/130
6,746,359 B2 * 6/2004 Kang et al. ............... 475/276
7,311,634 B2 * 12/2007 Shim ....................... 475/275

FOREIGN PATENT DOCUMENTS

WO    WO 03029699 A1 *    4/2003

* cited by examiner

*Primary Examiner*—Ha D. Ho
(74) *Attorney, Agent, or Firm*—Morgan, Lewis & Bockius LLP

(57) ABSTRACT

A shift control method of an automatic transmission that controls a shift from an $n^{th}$ shift speed, achieved by engagement of first and second friction elements, to an $(n-3)^{th}$ shift speed, achieved by engagement of third and fourth friction elements. The method includes releasing the first and second friction elements and engaging the third and fourth friction elements. Release control of the second friction element begins after release control of the first friction element begins. Engagement control of the fourth friction element begins after an engagement control of the third friction element begins.

29 Claims, 5 Drawing Sheets

|    | B1 | C1 | C2 | B2 | B3 | F1 |
|----|----|----|----|----|----|----|
| D1 | ●  |    |    |    |    | ●  |
| D2 | ●  |    |    | ●  |    |    |
| D3 | ●  |    | ●  |    |    |    |
| D4 | ●  | ●  |    |    |    |    |
| D5 |    | ●  | ●  |    |    |    |
| D6 |    | ●  |    | ●  |    |    |
| R  |    |    | ●  |    | ●  |    |

SHIFT CONTROL METHOD OF AUTOMATIC TRANSMISSION

CROSS-REFERENCE TO RELATED APPLICATION

This application claims priority to, and the benefit of, Korean Patent Application No. 10-2006-0072396, filed in the Korean Intellectual Property Office on Jul. 31, 2006, the entire contents of which are incorporated herein by reference.

BACKGROUND OF THE INVENTION (a) Field of the Invention

The present invention relates to a shift control method of an automatic transmission. More particularly, the present invention relates to a shift control method of an automatic transmission that controls a shift from an $n^{th}$ shift speed to an $(n-3)^{th}$ shift speed.

(b) Description of the Related Art

Generally, in a clutch-to-clutch shift control, one frictional element is released and another frictional element is engaged. However, during some skip shifting processes, two frictional elements may be released and two other frictional elements may be engaged. However, it is difficult to control such a shift.

In some instances, two shifting processes are successively performed. For example, to perform a 6 to 3 shift, a 4 to 3 shift is performed after a 6 to 4 shift is completed.

However, according to a conventional 6 to 3 skip shift control method, since two shifting processes are successively performed, a shifting time may be long, and the shift may not be smooth.

To solve such problems, the first and second shifts may be overlapped. However, a double shift feel may be felt. In addition, since controls of on-coming and off-going elements in the second shift are started differently, shift control may be difficult, since a shift to another shift speed is needed during the 6 to 3 shift.

The above information disclosed in this Background section is only for enhancement of understanding of the background of the invention and therefore it may contain information that does not form the prior art that is already known in this country to a person of ordinary skill in the art.

SUMMARY OF THE INVENTION

A shift control method of an automatic transmission that controls a shift from an $n^{th}$ shift speed, achieved by engagement of first and second friction elements, to an $(n-3)^{th}$ shift speed, achieved by engagement of third and fourth friction elements. The method includes releasing the first and second friction elements and engaging the third and fourth friction elements. Release control of the second friction element begins after release control of the first friction element begins. Engagement control of the fourth friction element begins after an engagement control of the third friction element begins.

Release control of the second friction element and the engagement control of the fourth friction element may begin simultaneously.

The release control of the second friction element and the engagement control of the fourth friction element may begin when a synchronizing point is reached.

The synchronizing point may be reached when a current turbine speed is equal to a predetermined turbine speed.

The predetermined turbine speed may be approximately 95% of a turbine speed of a middle shift speed between the $n^{th}$ shift speed and the $(n-3)^{th}$ shift speed.

The middle shift speed may be a shift speed where torque transmission in a shifting process can be minimized.

Engagement of the third friction element may begin after the synchronizing point is reached.

Engagement of the fourth friction element may begin after the current turbine speed is within a predetermined range of a turbine speed of the $(n-3)^{th}$ shift speed.

Hydraulic pressure of the first friction element may be reduced to a neutral state when the synchronizing point is reached. The hydraulic pressure of the first friction element may be completely released after the synchronizing point is reached.

One of the first and third friction elements may be a clutch and the other may be a brake. One of the second and fourth friction elements may be a clutch and the other may be a brake.

DETAILED DESCRIPTION OF PREFERRED EMBODIMENTS

Exemplary embodiments of the present invention will hereinafter be described in detail with reference to the accompanying drawings.

Figures 1, 2:
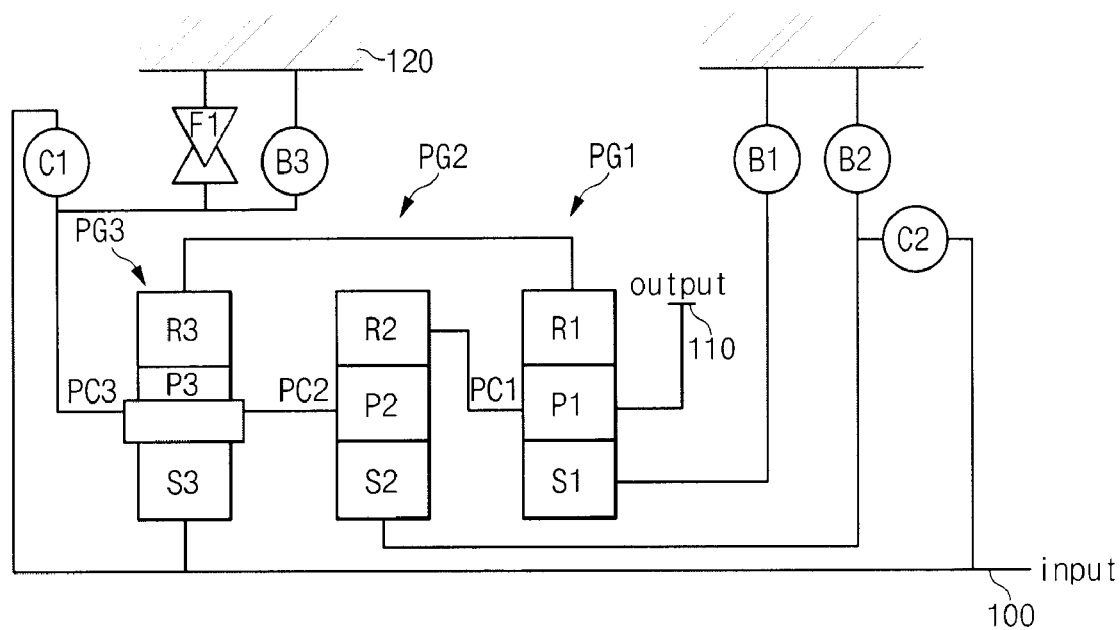
FIG. 1 is a schematic diagram of a power train of an automatic transmission according to an exemplary embodiment of the present invention.
FIG. 2 is an operational chart of a power train of an automatic transmission according to an exemplary embodiment of the present invention.

As shown in FIG. 1, a power train of an automatic transmission according to an exemplary embodiment of the present invention includes first, second, and third planetary gear sets PG1, PG2, and PG3.

The first planetary gear set PG1 is a single pinion planetary gear set, and includes a first sun gear S1, a first planet carrier PC1, and a first ring gear R1. A first pinion gear P1, engaged with the first ring gear R1 and the first sun gear S1, is connected to the first planet carrier PC1.

The second planetary gear set PG2 is a single pinion planetary gear set, and includes a second sun gear S2, a second planet carrier PC2, and a second ring gear R2. A second pinion gear P2, engaged with the second ring gear R2 and the second sun gear S2, is connected to the second planet carrier PC2.

The third planetary gear set PG3 is a double pinion planetary gear set, and includes a third sun gear S3, a third planet carrier PC3, and a third ring gear R3. A third pinion gear P3, engaged with the third ring gear R3 and the third sun gear S3, is connected to the third planet carrier PC3.

In addition, the power train includes an input shaft 100 for receiving torque from an engine (not shown), an output gear 110 for outputting torque from the power train, and a transmission case 120.

The first planet carrier PC1 is fixedly connected to the second ring gear R2. The second planet carrier PC2 is fixedly connected to the third planet carrier PC3. The first ring gear R1 is fixedly connected to the third ring gear R3. The third sun gear S3 always acts as an input element by being fixedly connected to the input shaft 100. The first planet carrier PC1 always acts as an output element by being fixedly connected to the output gear 110. The third planet carrier PC3 is variably connected to the input shaft 100 via a first clutch C1. The second sun gear S2 is variably connected to the input shaft 100 via a second clutch C2. The first sun gear S1 is variably connected to the transmission case 120 via a first brake B1 and is subjected to a stopping operation of the first brake B1. The second sun gear S2 is variably connected to the transmission case 120 via a second brake B2 and is subjected to a stopping operation of the second brake B2. The third planet carrier PC3 is variably connected to the transmission case 120 via a third brake B3 and is subjected to a stopping operation of the third brake B3. A one-way clutch F1 is disposed between the third planet carrier PC3 and the transmission case 120, in parallel with the third brake B3.

As shown in FIG. 2, the first brake B1 and the one-way clutch F1 operate at a first forward speed D1, the first and second brakes B1 and B2 operate at a second forward speed, and the first brake B1 and the second clutch C2 operate at a third forward speed D3. The first brake B1 and the first clutch C1 operate at a fourth forward speed D4, the first and second clutches C1 and C2 operate at a fifth forward speed D5, and the first clutch C1 and the second brake B2 operate at a sixth forward speed D6. The second clutch C2 and the third brake B3 operate at a reverse speed R.

Hereinafter, up-shifting processes for the power train shown in FIG. 1 will be described in detail. In a shifting process from the first forward speed D1 to the second forward speed D2, the second brake B2 is operated. In this case, the one-way clutch F1 is automatically released without additional control. In a shifting process from the second forward speed D2 to the third forward speed D3, the second brake B2 is released and the second clutch C2 is operated. In a shifting process from the third forward speed D3 to the fourth forward speed D4, the second clutch C2 is released and the first clutch C1 is operated. In a shifting process from the fourth forward speed D4 to the fifth forward speed D5, the first brake B1 is released and the second clutch C2 is operated. In a shifting process from the fifth forward speed D5 to the sixth forward speed D6, the second clutch C2 is released and the second brake B2 is operated. Down-shifting processes are reverse processes of the up-shifting processes.

Hereinafter, skip down-shifting processes for the power train of the automatic transmission shown in FIG. 1 will be described in detail. In a skip shifting process from the sixth forward speed D6 to the fourth forward speed D4, the second brake B2 is released and the first brake B1 is operated. In a skip shifting process from the fifth forward speed D5 to the third forward speed D3, the first clutch C1 is released and the first brake B1 is operated. In a skip shifting process from the fourth forward speed D4 to the second forward speed D2, the first clutch C1 is released and the second brake B2 is operated. In a skip shifting process from the third forward speed D3 to the first forward speed D1, the second clutch C2 is released. The one-way clutch F1 is automatically operated.

Figure 3:
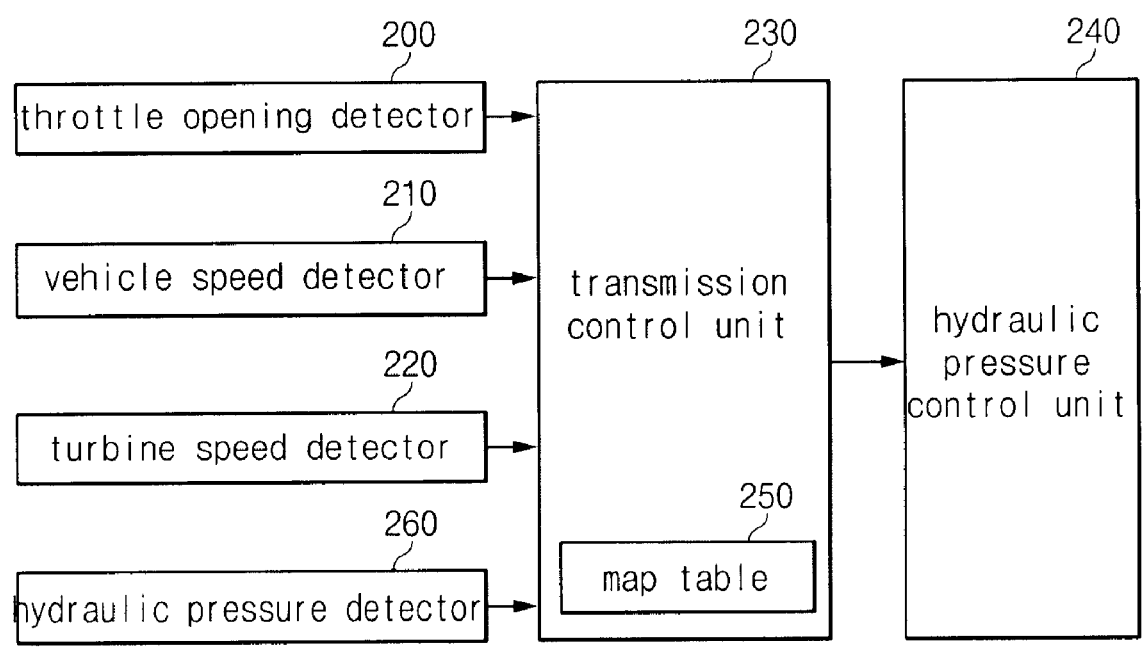
FIG. 3 is a block diagram of a system that performs a shift control method of an automatic transmission according to an exemplary embodiment of the present invention.

As shown in FIG. 3, a system that performs a shift control method of an automatic transmission according to an exemplary embodiment of the present invention includes a throttle opening detector 200, a vehicle speed detector 210, a turbine speed detector 220, a hydraulic pressure detector 260, a transmission control unit 230, and a hydraulic pressure control unit 240.

The throttle opening detector 200 detects a throttle opening that is operated in accordance with operation of the accelerator pedal, and transmits a signal corresponding thereto to the transmission control unit 230.

The vehicle speed detector 210 detects a vehicle speed and transmits a signal corresponding thereto to the transmission control unit 230.

The turbine speed detector 220 detects a current turbine speed operated as an input torque of the automatic transmission from an angular change of a crank shaft, and transmits a signal corresponding thereto to the transmission control unit 230.

The hydraulic pressure detector 260 detects hydraulic pressures applied to off-going and on-coming elements and transmits a signal corresponding thereto to the transmission control unit 230.

The transmission control unit 230 may include one or more processors activated by a predetermined program, and the predetermined program can be programmed to perform each step of the inventive method.

The transmission control unit 230 receives the signals from the throttle opening detector 200, the vehicle speed detector 210, the turbine speed detector 220, and the hydraulic pressure detector 260, generates a hydraulic pressure shift signal corresponding to the signals, and transmits the hydraulic pressure shift signal to the hydraulic pressure control unit 240.

In addition, the transmission control unit 230 includes a map table 250.

The throttle opening in accordance with the vehicle speed at each shift speed is stored in the map table 250. Therefore, the transmission control unit 230 calculates a target shift speed in accordance with the throttle opening signal and the vehicle speed signal, and determines whether a shifting condition is satisfied. In addition, a releasing pressure of an off-going element and an engaging pressure of an on-coming element at each shift speed are stored in the map table 250. A turbine speed at each shift speed is also stored in the map table 250.

Appropriate values of the throttle opening, engaging and releasing pressures, and turbine speed stored in the map table 250 may be selected by a person of an ordinary skill in the art based on the teachings herein.

The hydraulic pressure control unit 240 receives the hydraulic pressure shift signal from the transmission control unit 230 and controls hydraulic pressures applied to off-going and on-coming elements. The hydraulic pressure control unit 240 includes control valves and/or solenoid valves that control the hydraulic pressure.

Hereinafter, referring to FIG. 4, a shift control method according to an exemplary embodiment of the present invention will be described in detail.

In a shift control method of an automatic transmission according to an exemplary embodiment of the present invention, referring also to FIG. 2, an $n^{th}$ shift speed may be achieved by engagement of first and second friction elements, and an $(n-3)^{th}$ shift speed be achieved by engagement of third and fourth friction elements.

Figure 4:
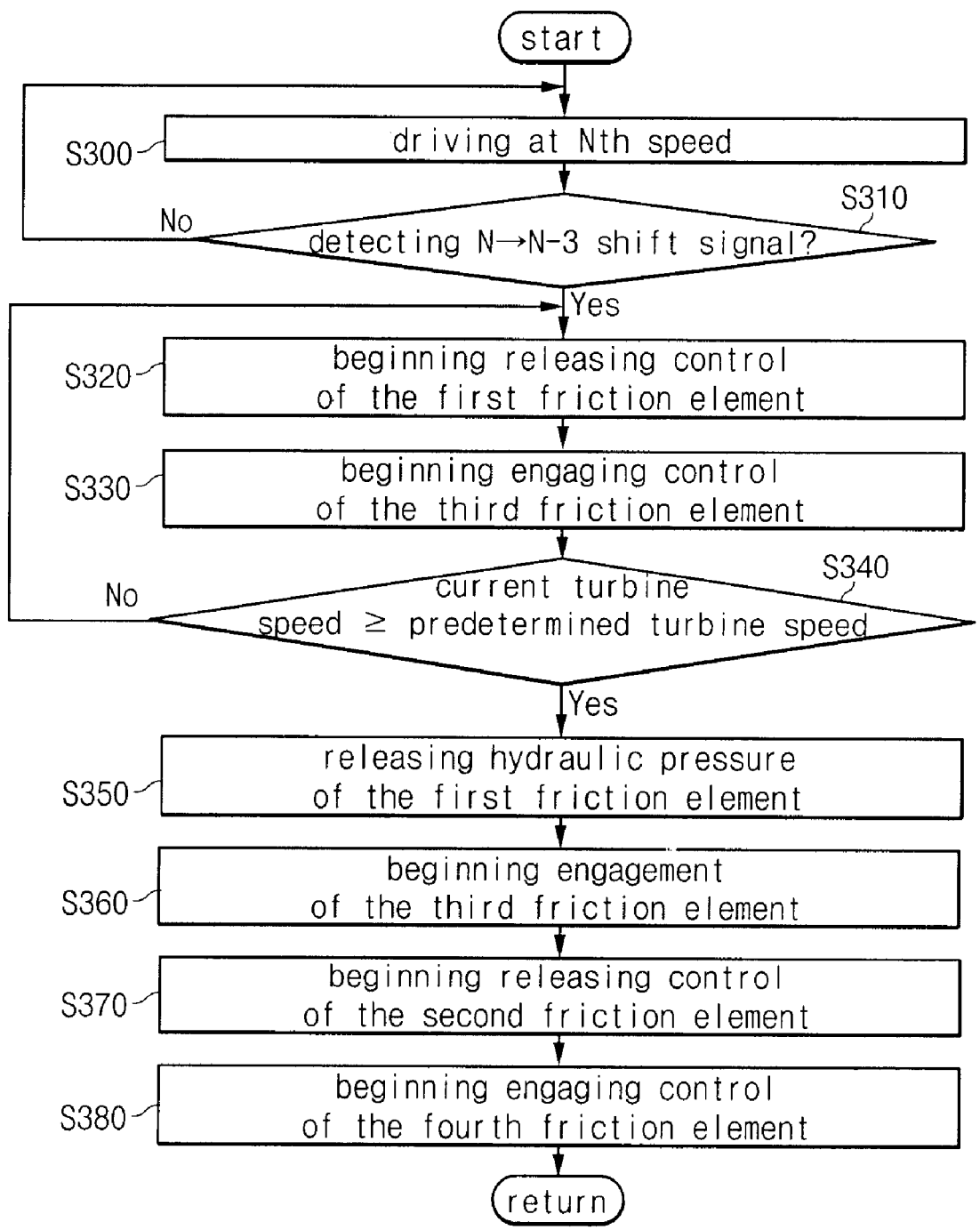
FIG. 4 is a flowchart showing a shift control method of an automatic transmission according to an exemplary embodiment of the present invention.

As shown in FIG. 4, when a vehicle is driven at the $n^{th}$ shift speed at step S300, the transmission control unit 230 determines whether an $n^{th}$ to $(n-3)^{th}$ shift signal is detected at step S310. The $n^{th}$ to $(n-3)^{th}$ shift signal is generated when the throttle opening (corresponding to the vehicle speed) is larger than or equal to a predetermined throttle opening.

If the transmission control unit 230 does not detect the $n^{th}$ to $(n-3)^{th}$ shift signal, the vehicle continues to be driven at the $n^{th}$ shift speed at step S300. If the transmission control unit 230 detects the $n^{th}$ to $(n-3)^{th}$ shift signal, the transmission control unit 230 begins a release control of the first friction element at step S320 and an engagement control of the third friction element at step S330. The release control of the first friction element and the engagement control of the third friction element may begin simultaneously. Here, beginning of the release and engagement controls means that hydraulic pressure of each friction element is started to be controlled.

During release control of the first friction element and engagement control of the third friction element, the transmission control unit 230 compares a current turbine speed with a predetermined turbine speed at step S340, determining whether a synchronizing point is reached.

The predetermined turbine speed may be 95% of a turbine speed of a middle shift speed between the $n^{th}$ shift speed and the $(n-3)^{th}$ shift speed. The middle shift speed is a shift speed where torque transmission in a shifting process can be minimized.

If the current turbine speed is smaller than the predetermined turbine speed at step S340, the transmission control unit 230 continues to control the release of the first friction element and the engagement of the third friction element. If the current turbine speed is larger than or equal to the predetermined turbine speed at step S340, the transmission control unit 230 determines that the synchronizing point is reached. After that, the transmission control unit 230 completely releases the hydraulic pressure of the first friction element at step S350, and begins an engagement of the third friction element at step S360.

Beginning of the release and engagement controls means that hydraulic pressure of each friction element is started to be controlled, and beginning of an engagement of a friction element means that the friction element actually begins to be engaged. That is, hydraulic pressure of the friction element, which is maintained at a stand-by pressure, begins to increase.

In addition, the transmission control unit 230 begins a release control of the second friction element at step S370, and begins an engagement control of the fourth friction element at step S380.

Figure 5:
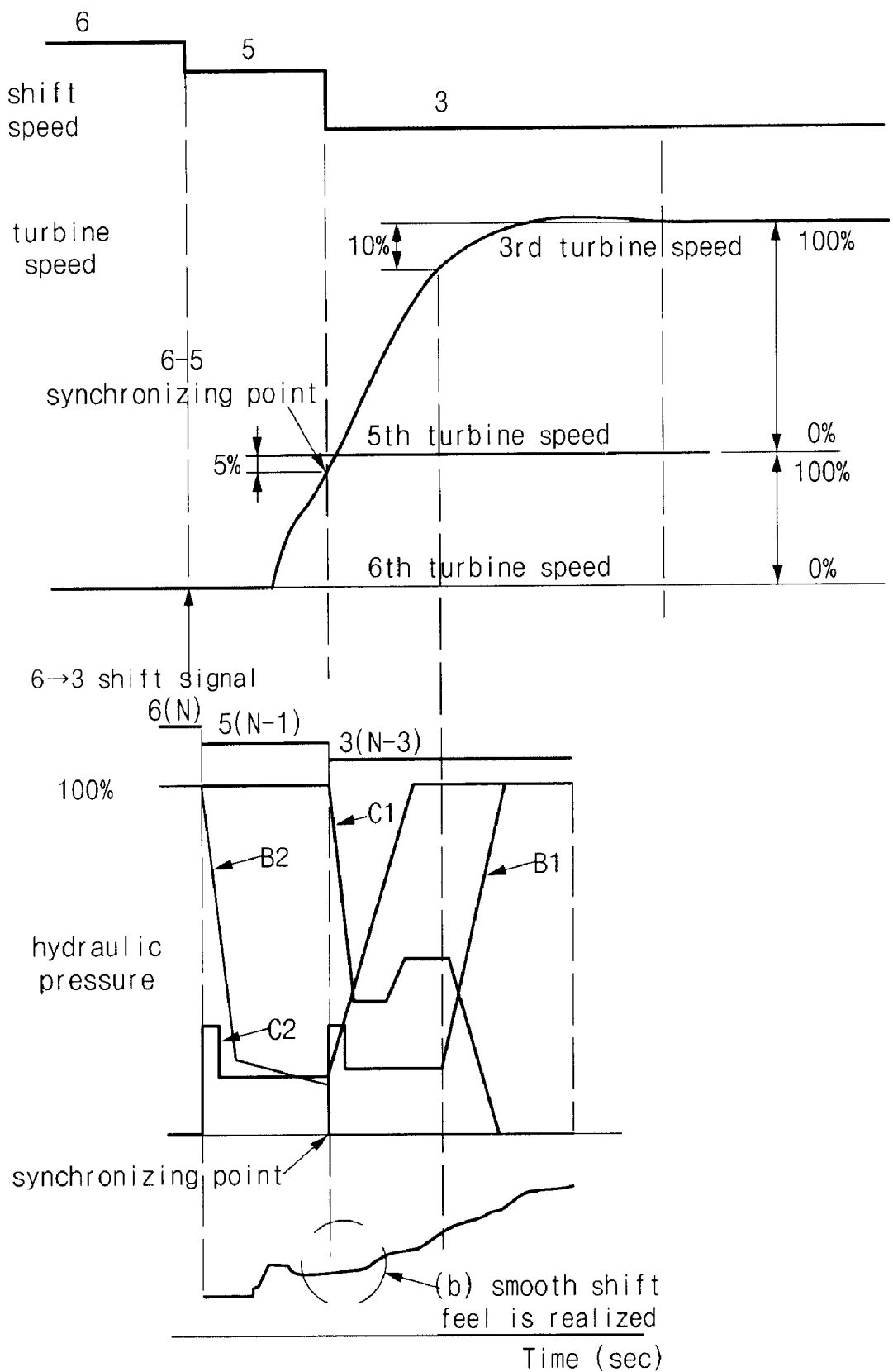
FIG. 5 is a graph showing a turbine speed, a control hydraulic pressure, and an output torque of an exemplary shift control method of an automatic transmission according to an embodiment of the present invention.
Figure 6:
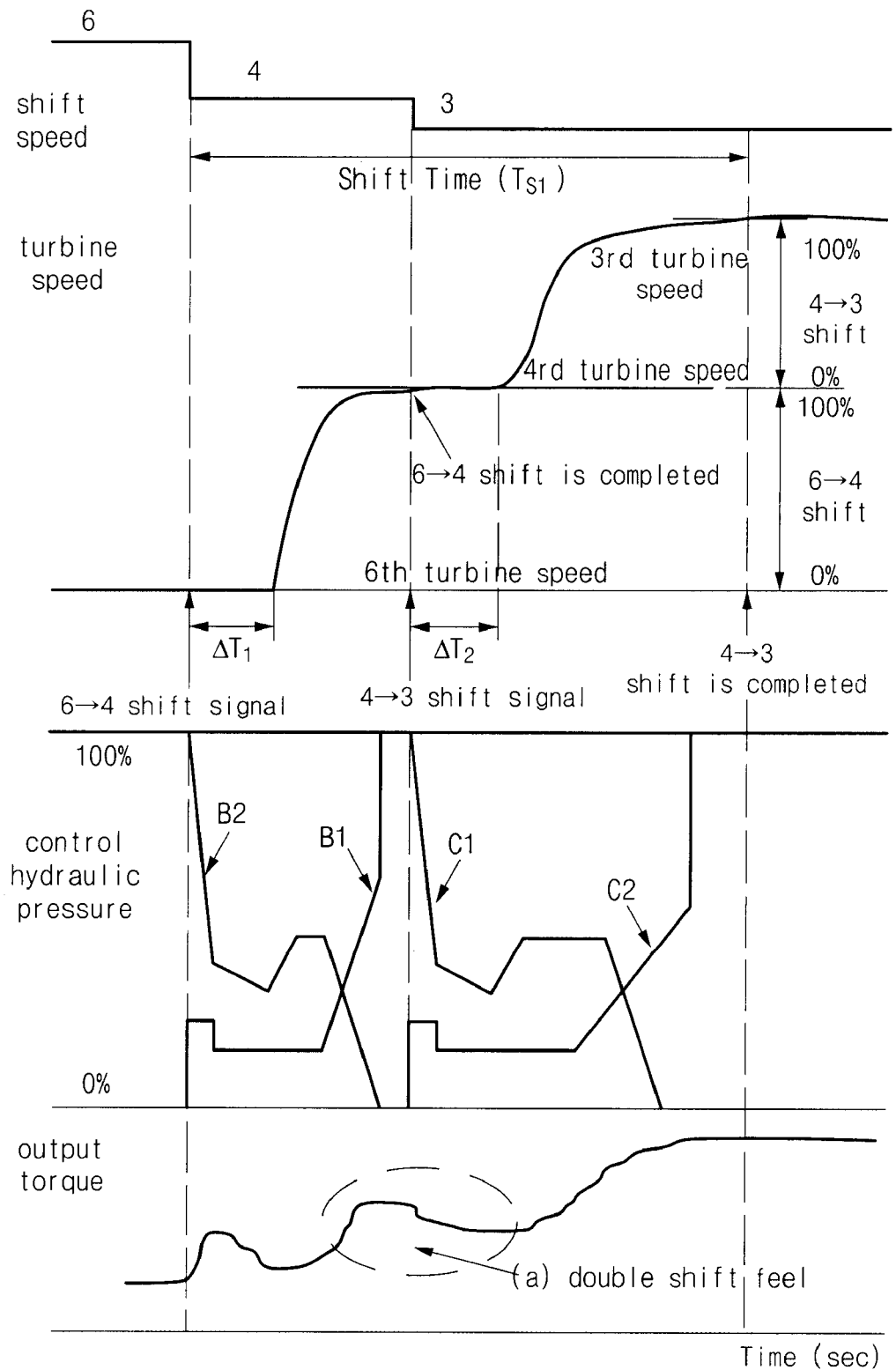
FIG. 6 is a graph showing a turbine speed, a control hydraulic pressure, and an output torque according to a conventional shift control method of an automatic transmission.

Referring to FIG. 5, a shift control method of an automatic transmission according to an exemplary embodiment of the present invention will be further described in detail. For purposed of example only, a 6 to 3 shift will be described. However, the present invention is not limited to a 6 to 3 shift and is applicable to all $n^{th}$ to $(n-3)^{th}$ shifts.

Referring to FIG. 2, in the illustrated embodiment, in a 6→3 shift, the first friction element is the second brake, the second friction element is the first clutch, the third friction element is the second clutch, and the fourth friction element is the first brake.

As shown in FIG. 5, in a state where the vehicle is driven at the sixth speed, the transmission control unit 230 receives a 6 to 3 shift signal and begins the release control of the first friction element and the engagement control of the third friction element. That is, the hydraulic pressure of the first friction element is reduced by a predetermined slope. In addition, the hydraulic pressure of the third friction element is quickly increased to a pre-charge pressure and is maintained at a stand-by pressure. The hydraulic pressure of the first friction element is sufficiently reduced to a neutral state at the synchronizing point. Sufficiently reducing the hydraulic pressure of the first friction element allows the method to avoid achieving a middle shift speed between the 6 shift speed and the 3 shift speed. If the middle shift speed is achieved, a driver may feel a double shift, i.e. a first shift from the 6 shift speed to the middle shift speed and a second shift from the middle shift speed to the 3 shift speed. Therefore, according to embodiments of the present invention, a turbine speed of the middle shift speed can be attained but the middle shift speed itself is not achieved.

Next, the transmission control unit 230 determines whether the synchronizing point is reached. The synchronizing point may be determined to be reached when the current turbine speed is the same as the predetermined turbine speed, e.g. 95% of the turbine speed of the middle shift speed (e.g., a 5 shift speed) between the 6 shift speed and the 3 shift speed. The middle shift speed is a shift speed where torque transmission in a shifting process can be minimized. For example, in a 6 to 3 shift, the middle shift speed may be the 5 shift speed.

If the synchronizing point is reached, the transmission control unit 230 completely releases the hydraulic pressure of the first friction element and begins the engagement of the third friction element. That is, the hydraulic pressure of the third friction element is increased by a predetermined slope. Beginning engagement of the third friction element after the synchronizing point is reached ensures that the middle shift speed is not achieved.

In addition, the transmission control unit 230 begins the release control of the second friction element and the engagement control of the fourth friction element. That is, the hydraulic pressure of the fourth friction element is quickly increased to the pre-charge pressure and is maintained at the stand-by pressure. In addition, the hydraulic pressure of the second friction element is reduced by a predetermined slope. Next, the hydraulic pressure of the second friction element is quickly increased and is reduced by a predetermined slope. The release control of the second friction element and the engagement control of the fourth friction element may simultaneously begin. If the release control of the second friction element and the engagement control of the fourth friction element simultaneously begin, a shift control to another shift speed during the 6 to 3 shift may be facilitated.

In addition, the transmission control unit 230 determines whether the current turbine speed is close to a turbine speed of the 3 shift speed within a predetermined range. The predetermined range may be 10% of the turbine speed of the 3 shift speed, and can be easily chosen by a person of an ordinary skill in the art.

If the current turbine speed is close to the turbine speed of the 3 shift speed within the predetermined range, the transmission control unit 230 begins the engagement of the fourth friction element. That is, the hydraulic pressure of the fourth friction element is increased by a predetermined slope.

The release control of the second friction element and the engagement control of the fourth friction element can be implemented by a person of an ordinary skill in the art based on the teachings herein. Therefore, detailed descriptions will be omitted.

According to the present invention, since a middle shift speed between an $n^{th}$ shift speed and an $(n-3)^{th}$ shift speed is prohibited from being achieved during an $n^{th}$ to $(n-3)^{th}$ shift, shift feel may be improved. In addition, since a release control of the second friction element and an engagement control of the fourth friction element begin simultaneously, shift control to another shift speed during the $n^{th}$ to $(n-3)^{th}$ shift may be facilitated. Further, since one of a brake and a clutch is engaged and the other is released, hydraulic pressure control may be facilitated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A shift control method of an automatic transmission that controls a shift from an $n^{th}$ shift speed, achieved by engagement of first and second friction elements, to an $(n-3)^{th}$ shift speed, achieved by engagement of third and fourth friction elements, comprising:

releasing the first and second friction elements; and
engaging the third and fourth friction elements;
wherein a release control of the second friction element begins after a release control of the first friction element begins;
wherein an engagement control of the fourth friction element begins after an engagement control of the third friction element begins;
and wherein the release control of the second friction element and the engagement control of the fourth friction element begin substantially simultaneously.

2. The shift control method of claim 1, wherein the release control of the second friction element and the engagement control of the fourth friction element begin when a synchronizing point is reached.

3. The shift control method of claim 2, wherein the synchronizing point is reached when a current turbine speed is substantially equal to a predetermined turbine speed.

4. The shift control method of claim 3, wherein the predetermined turbine speed is approximately 95% of a turbine speed of a middle shift speed between the $n^{th}$ shift speed and the $(n-3)^{th}$ shift speed.

5. The shift control method of claim 4, wherein the middle shift speed is a shift speed where torque transmission in a shifting process can be minimized.

6. The shift control method of claim 2, wherein an engagement of the third friction element begins after the synchronizing point is reached.

7. The shift control method of claim 6, wherein an engagement of the fourth friction element begins after a current turbine speed is within a predetermined range of a turbine speed of the $(n-3)^{th}$ shift speed.

8. The shift control method of claim 2, wherein hydraulic pressure of the first friction element is reduced to a neutral state when the synchronizing point is reached.

9. The shift control method of claim 8, wherein the hydraulic pressure of the first friction element is completely released after the synchronizing point is reached.

10. The shift control method of claim 1, wherein one of the first and third friction elements is a clutch and the other is a brake.

11. The shift control method of claim 1, wherein one of the second and fourth friction elements is a clutch and the other is a brake.

12. A shift control method of an automatic transmission that controls a shift from an $n^{th}$ shift speed, achieved by engagement of first and second friction elements, to an $(n-3)^{th}$ shift speed, achieved by engagement of third and fourth friction elements, comprising:

releasing the first and second friction elements; and
engaging the third and fourth friction elements;
wherein a release control of the second friction element begins after a release control of the first friction element begins;
wherein an engagement control of the fourth friction element begins after an engagement control of the third friction element begins;
and wherein an engagement of the third friction element begins after a synchronizing point is reached.

13. The shift control method of claim 12, wherein the synchronizing point is reached when a current turbine speed is substantially equal to a predetermined turbine speed.

14. The shift control method of claim 13, wherein the predetermined turbine speed is approximately 95% of a turbine speed of a middle shift speed between the $n^{th}$ shift speed and the $(n-3)^{th}$ shift speed.

15. The shift control method of claim 14, wherein the middle shift speed is a shift speed where torque transmission in a shifting process can be minimized.

16. The shift control method of claim 12, wherein hydraulic pressure of the first friction element is reduced to a neutral state when the synchronizing point is reached.

17. The shift control method of claim 16, wherein the hydraulic pressure of the first friction element is completely released after the synchronizing point is reached.

18. The shift control method of claim 12, wherein the release control of the second friction element and the engagement control of the fourth friction element begin after the synchronizing point is reached.

19. The shift control method of claim 18, wherein an engagement of the fourth friction element begins after a current turbine speed is within a predetermined range of a turbine speed of the $(n-3)^{th}$ shift speed.

20. The shift control method of claim 12, wherein one of the first and third friction elements is a clutch and the other is a brake.

21. The shift control method of claim 12, wherein one of the second and fourth friction elements is a clutch and the other is a brake.

22. A shift control method of an automatic transmission that controls a shift from an $n^{th}$ shift speed, achieved by engagement of first and second friction elements, to an $(n-3)^{th}$ shift speed, achieved by engagement of third and fourth friction elements, comprising:

releasing the first and second friction elements; and
engaging the third and fourth friction elements;
wherein a release control of the second friction element begins after a release control of the first friction element begins;
wherein an engagement control of the fourth friction element begins after an engagement control of the third friction element begins;
and wherein hydraulic pressure of the first friction element is reduced to a neutral state when the synchronizing point is reached.

23. The shift control method of claim 22, wherein the synchronizing point is reached when a current turbine speed substantially equal to a predetermined turbine speed.

24. The shift control method of claim 23, wherein the predetermined turbine speed is approximately 95% of a turbine speed of a middle shift speed between the $n^{th}$ shift speed and the $(n-3)^{th}$ shift speed.

25. The shift control method of claim 24, wherein the middle shift speed is a shift speed where torque transmission in a shifting process can be minimized.

26. The shift control method of claim 22, wherein the release control of the second friction element and the engagement control of the fourth friction element begin after the synchronizing point is reached.

27. The shift control method of claim 26, wherein an engagement of the fourth friction element begins after a current turbine speed is within a predetermined range of a turbine speed of the $(n-3)^{th}$ shift speed.

28. The shift control method of claim 22, wherein one of the first and third friction elements is a clutch and the other is a brake.

29. The shift control method of claim 22, wherein one of the second and fourth friction elements is a clutch and the other is a brake.

* * * * *